United States Patent [19]

Breininger et al.

[11] 4,148,940
[45] Apr. 10, 1979

[54] METHOD FOR DEPOSITING FILMS CONTAINING COBALT OXIDE

[75] Inventors: J. Shannon Breininger, Gibsonia; Charles B. Greenberg, Murraysville, both of Pa.

[73] Assignee: PPG Industries, Inc., Pittsburgh, Pa.

[21] Appl. No.: 890,562

[22] Filed: Mar. 20, 1978

[51] Int. Cl.$^2$ .......................... B05D 1/02; B05D 5/12
[52] U.S. Cl. .................................. 427/226; 427/255; 427/314; 427/294; 427/422; 428/432; 260/439 R; 260/429 J; 260/429.3
[58] Field of Search ............... 427/226, 372 R, 248 R, 427/248 A, 248 B, 427; 427/165, 166, 168; 260/429 J, 439 R

[56] References Cited

U.S. PATENT DOCUMENTS

| | | | |
|---|---|---|---|
| 3,081,200 | 3/1963 | Tompkins | 427/126 |
| 3,410,710 | 11/1968 | Mochel | 427/160 |
| 3,411,934 | 11/1968 | Englehart et al. | 65/30 R |
| 3,660,061 | 5/1972 | Donley et al. | 65/32 |
| 3,850,665 | 11/1974 | Plumat et al. | 428/432 |
| 3,852,098 | 12/1974 | Bloss et al. | 427/226 |
| 4,008,260 | 2/1977 | Kunstle et al. | 260/439 R |

Primary Examiner—Ronald H. Smith
Assistant Examiner—Raymond C. Johnson
Attorney, Agent, or Firm—Donna L. Seidel

[57] ABSTRACT

Improved methods are disclosed for depositing metal oxide films from coating compositions containing dehydrated cobaltous acetylacetonate.

10 Claims, No Drawings

METHOD FOR DEPOSITING FILMS CONTAINING COBALT OXIDE

BACKGROUND OF THE INVENTION

The present invention relates generally to the deposition of coatings containing cobalt oxide either by pyrolysis of coating reactants in solution or by chemical vapor deposition. The present invention relates particularly to the formation of coatings containing cobalt oxide in a mixed metal oxide spinel structure.

In U.S. Pat. No. 3,081,200, Tompkins discloses a method for preparing coatings containing oxides of metals, including cobalt, by the pyrolysis of metal acetylacetones in organic solvents. In U.S. Pat. No. 3,660,061, Donley et al disclose coating compositions comprising organic solvents and organometallic coating reactants including cobalt acetylacetonate. While no specific valence state of cobalt is disclosed as preferred, commercial activity has been developed upon the use of cobaltic acetylacetonate primarily because common cobaltous acetylacetonate, which is hydrated, is relatively insoluble in the organic solvents listed in U.S. Pat. No. 3,660,061.

In U.S. Pat. No. 3,852,098, Bloss et al disclose contacting a hot glass substrate with a gaseous mixture 50 to 100 percent saturated with the vapors at a reactive metal compound which thermally reacts to deposit a metal-containing coating on the surface. Based on thermodynamic data, from the viewpoint of vaporization behavior, cobalt III-acetylacetonates are preferred to cobalt II-acetylacetonates for chemical vapor deposition.

It has been observed that metal oxide films formed from the above-described coating compositions may include cobaltous oxide in a $Co_3O_4$ ($CoO.Co_2O_3$) spinel structure even though cobaltic acetylacetonate is used as the coating reactant and the film is formed in a generally oxidizing atmosphere. This observation leads to the belief that some proportion of cobaltic ions are reduced to cobaltous ions prior to the deposition of cobalt oxide.

Analysis of mixed metal oxide films formed on glass from metal acetylacetonates either by pyrolysis of coating reactants in solution or by chemical vapor deposition indicates that the metal oxides tend to assume a spinel structure which is characteristically very durable. In a spinel structure, oxygen ions form a close packed array leaving interstitial spaces to be occupied by the metal ions. The interstitial spaces having four nearest neighbors are filled by cations which coordinate tetrahedrally while the spaces having six nearest neighbors are filled with cations which coordinate octahedrally. Some metal ions will coordinate either tetrahedrally or octahedrally while others, such as chromic and cobaltic, prefer octahedral coordination. In the deposition of mixed metal oxide films, when it is desired to form a spinel structure which has a general formula of $A_8B_{16}O_{32}$, wherein A represents cations which are tetrahedrally coordinated and B represents cations which are octahedrally coordinated, it is important to have an appropriate ratio of A and B type cations since the composition of the film may vary depending on the relative availability of A and B type cations.

SUMMARY OF THE PRESENT INVENTION

The present invention recognizes that cobaltic ions prefer octahedral coordination and that in certain mixed metal coating compositions, particularly those including organochromium reactants, there may be competition for octahedral sites. If there are too many octahedrally coordinating cations and too few tetrahedrally coordinating cations, a preferred spinel structure may be replaced by a coating of different overall structure, composition, and durability. When it is desired to maintain a certain ratio of metals in a cobalt-containing metal oxide coating, but the ratio of octahedrally to tetrahedrally coordinating cations is inappropriate for spinel formation, the present invention provides for replacing the cobaltic ions with cobaltous ions, which will coordinate either tetrahedrally or octahedrally, by replacing the cobaltic acetylacetonate coating reactant with cobaltous acetylacetonate. Although commercially available hydrated cobaltous acetylacetonate is relatively insoluble in the commonly used organic solvents, the present invention provides for dehydrating the cobaltous acetylacetonate which may then be dissolved in an organic solvent. The coating compositions of the present invention, containing dehydrated cobaltous acetylacetonate, may be used to deposit coatings containing cobalt oxide either by pyrolysis of a coating solution or by solvent-free chemical vapor deposition. It appears that the absence of water of hydration improves the uniformity of coatings formed by chemical vapor deposition.

DETAILED DESCRIPTION OF THE PREFERRED EMBODIMENTS

A continuous ribbon of glass is formed in a bath of molten metal, preferably tin or a tin alloy, in a refractory tank. The ribbon is lifted from the bath at the exit end of the tank and is conveyed through a coating area. A plurality of spray guns are positioned above the glass ribbon to deliver a coating composition to the top surface of the ribbon. The coating composition comprises a mixture of metal beta diketonates, preferably metal acetylacetonates, including dehydrated cobaltous acetylacetonate, in an organic solvent. The dehydrated cobaltous acetylacetonate is obtained by placing readily available hydrated cobaltous acetylacetonate in a vacuum chamber for about 10 hours at a temperature of about 140° F. (about 60° C.). Shorter periods or lower temperatures may be used with less than production quantities. The dehydrated cobaltous acetylacetonate is readily soluble in organic solvents such as disclosed in U.S. Pat. No. 3,660,061 which disclosure is in whole incorporated herein by reference. The coating composition is applied from the spray gun to the glass surface at a rapid rate to insure uniformity of the coating. The coating reactants pyrolyze on contact with the glass surface which is at a temperature above about 500° F. (about 260° C.), preferably from about 1000° to 1200° F. (about 540° to 650° C.) to form a mixed metal oxide film. Preferred coating compositions comprise about 2 percent by weight metal in an organic solvent, preferably aliphatic or olefinic halocarbons or halogenated hydrocarbons, or mixtures thereof. The preferred coating reactants are acetylacetonates of cobalt, iron, nickel, chromium, copper, manganese, titanium, vanadium and mixtures thereof. The coating compositions of the present invention comprise dehydrated cobaltous acetylacetonate, preferably in a mixture with ferric and chromic acetylacetonates.

The present invention will be further understood from the descriptions of specific examples which follow.

EXAMPLE I

A mixture of acetylacetonates comprising, by weight of metal, 64 percent cobalt, 18 percent chromium and 22 percent iron is dissolved in an organic solvent. The mixture comprises dehydrated cobaltous acetylacetonate prepared by heating readily available hydrated cobaltous acetylacetonate to about 140° F. (about 60° C.) in vacuo for about 12 hours. The total concentration of metal in the coating solution is about 2 percent by weight. The organic solvent is 50/50 percent by volume methylene chloride and trichloroethylene. The coating solution is sprayed onto a surface of a 7/32 inch (about 6 millimeters) thick clear glass substrate which is at a temperature of about 1120° F. (about 605° C.). The metal acetylacetonates pyrolyze to form a mixed metal oxide spinel-type film on the glass surface. The luminous transmittance of the coated glass is about 38 percent.

EXAMPLE II

A mixture of acetylacetonates comprising, by weight of metal, 64 percent cobalt, 18 percent chromium and 22 percent is prepared as a powdered solid. The mixture comprises dehydrated cobaltous acetylacetonate as in Example I. The coating composition is vaporized and applied to a surface of a 7/32 inch (about 6 millimeters) thick clear glass substrate by chemical vapor deposition. A relatively texture-free mixed metal oxide spinel-type film is formed on the glass surface. The luminous transmittance of the coated glass is about 42 percent.

EXAMPLE III

A coating composition is prepared by dissolving dehydrated cobaltous acetylacetonate in methylene chloride at a concentration of 2 percent by weight cobalt. The solution is sprayed onto a glass surface at a temperature of about 1100° F. (about 593° C.). The resultant cobalt oxide coated glass article has a luminous transmittance of about 27 percent.

The above examples are offered to illustrate preferred embodiments of the present invention. The examples relating to pyrolytic deposition show that the use of dehydrated cobaltous acetylacetonate is compatible with organic solvents. The examples relating to chemical vapor deposition show that the use of dehydrated cobaltous acetylacetonate in the chemical vapor deposition of coatings containing cobalt oxide results in a uniform film. Cobaltous acetylacetonate may be dehydrated under a variety of temperature and pressure conditions requiring various periods of time. The higher the temperature and the lower the pressure, the shorter the period required to effectively dehydrate the cobaltous acetylacetonate. Sufficient dehydration may be determined simply by visual examination since the hydrated cobaltous acetylacetonate is a fleshy pale pink colar while the dehydrated cobaltous acetylacetonate is purple. Dehydrated cobaltous acetylacetonate may be used alone or in combination with a variety of organometallic coating reactants, and in a variety of solvents as well as in powder form. Although the invention has been described in detail with respect to cobaltous acetylacetonate, the invention also encompasses the dehydration of hydrated nickelous and other transition metal acetylacetonate. These hydrated acetylacetonates have inadequate solubility in organic solvents, but upon dehydration become sufficiently soluble to be used in coating solutions for pyrolytic deposition of metal oxide films. The scope of the present invention is limited only the following claims.

We claim:

1. In a method for depositing metal oxide coatings which comprise cobalt oxide by thermal decomposition of a coating composition comprising an organometallic coating reactant and an organic solvent, the improvement which comprises:
    a. dehydrating cobaltous acetylacetonate; and
    b. dissolving the dehydrated cobaltous acetylacetonate in said organic solvent.

2. The improved method according to claim 1, wherein the organometallic coating composition is prepared by:
    (a) dehydrating the cobaltous acetylacetonate; and
    (b) mixing the dehydrated cobaltous acetylacetonate with an acetylacetonate of a metal selected from the group consisting of iron, cobalt, chromium, copper, nickel, tin, titanium, zirconium, vanadium, and mixtures thereof.

3. The improved method according to claim 2, wherein the dehydration of cobaltous acetylacetonate is accomplished by heating the coating reactant in vacuo for at least about 10 hours at a temperature of at least about 140° F. (about 60° C.).

4. The improved method according to claim 2, wherein the coating composition is dissolved in an organic solvent and is applied by spraying onto a hot glass substrate whereupon the coating reactants pyrolyze to form a metal oxide film.

5. The improved method according to claim 4 wherein the organic solvent is selected from the group consisting of aliphatic halocarbons, olefinic halocarbons, halogenated hydrocarbons and mixtures thereof.

6. In a method for preparing an organometallic coating composition for the deposition of coatings comprising cobalt oxide, the improvement which comprises:
    (a) dehydrating cobaltous acetylacetonate; and
    (b) incorporating dehydrated cobaltous acetylacetonate into the coating composition which further comprises an organic solvent.

7. The improved method according to claim 6, wherein the coating composition further comprises an acetylacetonate of a metal selected from the group consisting of iron, chromium, copper, cobalt, nickel, tin, titanium, zirconium, vanadium and mixtures thereof.

8. The improved method according to claim 7, wherein the coating composition further comprises an organic solvent selected from the group consisting of aliphatic hoalocarbons, olefinic halocarbons, halogenated hydrocarbons and mixtures thereof.

9. A composition for the deposition of coatings comprising cobalt oxide by thermal decomposition of an organometallic coating composition which comprises an organic solvent, dehydrated cobaltous acetylacetonate and an acetylacetonate of a metal selected from the group consisting of iron, cobalt, chromium, copper, nickel, tin, titanium, zirconium, vanadium, and mixtures thereof.

10. The composition of claim 9 wherein the organic solvent is selected from the group consisting of aliphatic halocarbons, olefinic halocarbons, halogenated hydrocarbons and mixtures thereof.

* * * * *